United States Patent Office 3,380,971
Patented Apr. 30, 1968

3,380,971
CHEMICAL POLYMERS
John R. Chalmers, Wallingford, Pa., and Frederic B. Stilmar, Wilmington, Del., assignors to E. I. du Pont de Nemours and Company, Wilmington, Del., a corporation of Delaware
No Drawing. Filed Oct. 30, 1964, Ser. No. 407,858
22 Claims. (Cl. 260—78.5)

ABSTRACT OF THE DISCLOSURE

A copolymer of (1) tetrafluoroethylene, (2) 0.5 to 1.50 moles per mole of tetrafluoroethylene of at least one terminally unsaturated $C_2$ to $C_8$ aliphatic hydrocarbon, (3) 0.05 to 0.5 mole per mole of tetrafluoroethylene of at least one polymerizable vinyl ester of an aromatic carboxylic acid, and, optionally, (4) either (a) 0.05 to 0.3 mole per mole of tetrafluoroethylene of at least one polymerizable halogenated olefin, a vinyl ester of a saturated alkane carboxylic acid or an alkyl vinyl ether, or (b) 0.005 to 0.2 mole per mole of tetrafluoroethylene of at least one olefinically unsaturated acid having an acidity constant of 1.0 to 5.5 or its ester, salt or anhydride. The copolymers are in general useful as durable, tough, adhesive coating compositions.

---

The present invention is directed to novel interpolymers of tetrafluoroethylene, hydrocarbon olefins and certain vinyl aromatic esters.

The novel interpolymers of this invention are useful for molding, fiber and self-supporting film applications and are particularly useful as easily applied, chemically resistant, weatherable protective coatings for a variety of substrates.

Recently, several polymers of fluorinated olefins have become commercially available. These fluorinated olefin polymers, such as polytetrafluoroethylene, can be used in a variety of applications due to a unique combination of physical and chemical properties. Chemically these polymers offer excellent resistance to corrosive chemicals. Physically, these polymers possess good thermal stability, excellent dielectric properties and antistick characteristics. However, although the known highly fluorinated olefin polymers do possess these unusual properties, their chemical and physical characteristics are not sufficient to provide the balance of properties necessary to give useful, easily applied, protective coating compositions.

The polymerization of tetrafluoroethylene with a variety of other olefins such as ethylene, propylene, isobutylene, vinyl chloride, vinyl fluoride, chlorotrifluoroethylene, vinyl benzoate, and methyl methacrylate has also been disclosed in the art. In general, these polymers, in all molecular weight ranges, are not useful for preparing surface coatings because they possess one or more of the following disadvantages. These polymers, depending on their molecular weight range, are either poorly tractable, have limited solubility, are easily marred, do not adhere well to most substrates, or have poor flexibility.

In order to be useful as a protective film-forming coating composition, a polymer must have the following characteristics. The polymer must be tractable and easily applied to substrates. The polymer must at the same time be formable to hard, mar-resistant, yet flexible, coatings resistant to impact. The polymer must, by itself, be capable of forming a strong adhesive bond between itself and any substrate to which it is applied. This adhesion must manifest itself in three important ways in protective film-forming coatings. First of all, the adhesion must be thermally stable. Secondly, the adhesion must have photo stability. Finally, the adhesion must be stable to the presence of water at the interface. A polymer coating having adhesion in the presence of heat, light and water will have long-term outdoor durability. Coalescibility to continuous tough films at reasonable temperatures and resistance to corrosive materials and most common industrial solvents are also essential in any protective polymer coating. For most coating applications, the polymer must have good pigment binding and dispersing capacity. None of the known fluorine-containing polymers have these enumerated characteristics in the proper balance to enable their use as self-bonding protective coatings.

It is, therefore, an object of this invention to provide fluorine-containing vinyl interpolymers having the combination of chemical and physical properties required to provide the balance of properties necessary to give superior film-forming coating compositions.

This and other objects will become apparent hereinafter.

More specifically, the polymers of the present invention possessing the balance of properties required for protective surface coatings are interpolymers comprising (1) tetrafluoroethylene, (2) from about 0.5 to about 1.50 mole per mole of tetrafluoroethylene of at least one $C_2$ to $C_8$ aliphatic hydrocarbon having only one terminal ethylenically unsaturated group, and (3) from about 0.05 to about 0.5 mole per mole of tetrafluoroethylene of at least one polymerizable vinyl ester of an aromatic carboxylic acid, wherein the aromatic group or nucleus is derived from benzene or naphthalene.

The present invention is also directed to interpolymers where, in addition to the components of classes (1), (2) and (3) above, the polymers also contain as an optional component either (A) from about 0.05 to about 0.3 mole per mole of tetrafluoroethylene of at least one olefinically unsaturated polymerizable compound selected from the group consisting of (a) polymerizable halogenated olefins of 2 to 3 carbon atoms, said halogens being chosen from chlorine and fluorine, (b) vinyl esters of saturated alkane carboxylic acids of 2 to 18 carbons, and (c) alkyl vinyl ethers wherein the alkyl group contains from 1 to 6 carbon atoms, or (B) from about 0.005 to about 0.2 mole per mole of tetrafluoroethylene of at least one olefinically unsaturated polymerizable compound chosen from acids having an acidity constant within the range of from about 1.0 to about 5.5 and the ester, salt and anhydride derivatives of such acids.

The present invention is further directed to interpolymers comprising, in addition to the components of classes (1), (2) and (3) hereinabove described, both optional components (A) and (B).

The polymer products of this invention consist of three essential components. These essential components are tetrafluoroethylene, at least one terminally unsaturated aliphatic hydrocarbon monoolefin and at least one vinyl aromatic carboxylate. For each mole of tetrafluoroethylene in the product, from 0.50 to 1.50 moles of the hydrocarbon olefin and from 0.05 to 0.5 mole of the vinyl aromatic carboxylate must be present. If either the hydrocarbon olefin or vinyl aromatic carboxylic are present in amounts outside these ranges, the polymer products obtained do not have the desirable combination of properties necessary for superior coating compositions. For example, polymer products containing less than 0.05 mole of vinyl aromatic carboxylates are not useful surface coatings because they are softer and less tractable than the corresponding products of this invention containing the specified amount of vinyl aromatic carboxylate.

The aliphatic hydrocarbons having only one terminal ethylenically unsaturated group, i.e., hydrocarbon olefins, which are useful in this invention have the structure $CH_2=CR_2$ where each R may be hydrogen or an alkyl group, or together the two R's may be joined to form a cycloaliphatic group. One or more of these olefins must be present in the polymer in amounts of from 0.50 to 1.50 moles per mole of tetrafluoroethylene. The olefins which are utilized to form the novel polymers of this invention contain from 2 to 8 carbon atoms and include such well-known monomers as ethylene, propylene, 1-butene, 1-pentene, 1-hexane, 1-heptene, 1-octane, isobutylene, isopentene, methylenecyclohexane, methylenenorbornylene (only the exocyclic double bond is polymerizable), and various olefins containing branched chain alkyl groups such as 4-methyl-1-pentene, and 3,3-dimethyl-1-butene. These olefins are all characterized by having only one terminally ethylenically unsaturated group $CH_2=C<$. They are all free of aromatic groups, as styrene and similar compounds are not useful in this invention. It has been generally found that tetrafluoroethylene and the aliphatic hydrocarbon olefins enter the polymerizable products of this invention in approximately 1 to 1 mole ratios so long as both monomers are present in the polymerization reaction in sufficient quantities. There is good reason to believe that the tetrafluoroethylene and hydrocarbon olefin enter the polymers of this invention in an alternating manner. In other words, the repeating groups—$CF_2CF_2CH_2CR_2$—occur in the polymer chain in regular order. The present status of the art, however, is insufficient to conclusively prove whether this is entirely the case or not. Of the hydrocarbon olefins, ethylene and isobutylene are the preferred species.

The specific properties of the invention interpolymers and, thus, the specific coating utility for which a given interpolymer is best suited, depend in large part on the nature of the terminally unsaturated aliphatic hydrocarbon olefin present in the polymer. For example, interpolymers comprising tetrafluoroethylene, ethylene and a vinyl aromatic carboxylate are relatively insoluble in common organic solvents at room temperature and are best applied as a coating at elevated temperature either by a melt technique or from a hot solution. The resulting polymer coatings, since they possess inertness and resistance to most organic solvents, are particularly useful in applications such as coating liners for the interior of containers carrying industrial solvents and as a fiber for weaving into fabrics useful as filter media. Moreover, even very thin coatings of the tetrafluoroethylene/ethylene/ vinyl benzoate interpolymers are able to provide this coating protection to a variety of substrates. The invention interpolymers comprising tetrafluoroethylene, isobutylene and a vinyl aromatic carboxylate are particularly useful as weatherable, mar-resistant, film-forming coating compositions applicable from solution at ambient temperatures. Protective coatings which coalesce at ambient temperature are readily prepared from solutions of these tetrafluoroethylene/isobutylene/vinyl aromatic carboxylate interpolymers in such common inexpensive organic solvents as trichloroethylene and xylene. These coatings are stable to light and weather, are highly mar-resistant and, in general, possess all of the properties necessary for a superior film forming coating composition. The interpolymers comprising tetrafluoroethylene, propylene or longer straight-chain olefins and a vinyl aromatic carboxylate, in contrast to those containing ethylene and isobutylene, are somewhat more flexible and tractable. These interpolymers, because of their good tractability, are readily formed into abrasion-resistant, relatively chemically inert coatings or unsupported films either by solution or melt techniques.

The vinyl esters of aromatic carboxylic acids useful in this invention have the structure $CH_2=CHO_2CAR$. AR in the structural formula represents a carbocyclic aromatic group derived from benzene or naphthalene. The benzene or naphthalene groups may be free of substituents other than hydrogen such as in vinyl benzoate or vinyl naphthoate or may carry one or more substituents attached to the benzene or naphthalene ring. These substituents, however, must not interfere with free radical polymerizations. Typical examples of such substituents are carboxyl, carboalkoxyl, acyl including benzoyl, cyano, halo, including fluorine, chlorine, and bromine, alkylsulfonyl, phenyl, sulfamido, trifluoromethyl, hydroxyl, alkoxyl, alkyl, aryloxy, acyloxy, thioether and the phosphonic and sulfonic acid groups. Groups which are known to interfere with polymerization are the aldehyde group, the amino group, the nitroso group and the nitro group.

The preferred vinyl aromatic carboxylate is vinyl benzoate. Of the substituted vinyl benzoates, the vinyl chlorobenzoates are particularly preferred. Vinyl esters of aromatic acids containing three or more fused benzene rings are not as useful in the polymers of the present invention because they are either not readily copolymerizable to interpolymers or yield products which are too high melting and intractable to meet the requirements for protective coating compositions.

Typical examples of useful vinyl aromatic carboxylates are the vinyl esters of the following acids: benzoic, naphthoic, chlorobenzoic, bromobenzoic, fluorobenzoic, chloronaphthoic, bromonaphthoic, fluoronaphthoic, dichlorobenzoic, dibromobenzoic, difluorobenzoic, dichloronaphthoic, carboalkoxylbenzoic (monoalkyl ester of phthalic, isophthalic or terephthalic acids), acetylbenzoic, carboalkoxylchlorobenzoic (e.g., monoalkyl ester of chlorophthalic acid), cyanobenzoic, chlorocyanobenzoic, bromocyanobenzoic, phenylbenzoic, chlorophenylbenzoic, fluorophenylbenzoic, phenylchlorobenzoic, trifluoromethylbenzoic, trifluoromethylnaphthoic, carboalkoxyphenylbenzoic, chloromethylbenzoic, cyanomethylbenzoic, carboalkoxynaphthoic (i.e., monoalkyl ester of naphthalic acid), and acetylnaphthoic acid, and the monovinyl esters of the following dicarboxylic acids: phthalic, isophthalic, terephthalic, diphenic, naphthalic, salicylic, chlorosalicylic, methoxybenzoic, anisic, toluic, tert.-butylbenzoic, phenoxybenzoic, methylthiobenzoic, acetyl salicylic, hydroxynaphthoic, chlorohydroxynaphthoic and methoxynaphthoic acids.

In certain cases, and particularly where very high solubility in organic solvents is desired while retaining other basic properties of the polymer compositions of this invention, it is permissible and preferable to copolymerize with the tetrafluoroethylene, hydrocarbon olefin and vinyl aromatic carboxylate up to about 0.3 mole per mole of tetrafluoroethylene of certain other polymerizable olefinic materials. These materials which increase polymer solubility are referred to as the optional monomer component (A). When this optional monomer is used, at least about 0.05 mole per mole of tetrafluoroethylene is required. Such materials included as the optional component (A) are the halogenated olefins containing from 2 to 3 carbon atoms such as the chloroolefins of 2 to 3 carbon atoms, the fluoroolefins of 2 to 3 carbon atoms, and the chlorofluoroolefins of 2 to 3 carbon atoms (including the partly halogenated and partly hydrocarbon olefins), the vinyl esters of alkane carboxylic acids of 2 to 18 carbons and alkyl vinyl ethers wherein the alkyl group contains 1 to 6 carbons. The halogenated olefins are useful for increasing solubility and flexibility of the polymer where this is desirable such as in coatings on wood which undergo periodic expansion and contraction. The vinyl alkanecarboxylates and the alkyl vinyl ethers are useful for increasing the solubility of the polymers over that obtainable with the basic polymer compositions without adversely affecting durability and other desirable coating properties.

Representative examples of the optional halogenated olefin are vinyl chloride, vinylidene chloride, dichloroethylene, vinyl fluoride, vinylidene fluoride, trifluoroethylene, difluoroethylene, dichlorodifluoroethylene, chlorofluoroethylene, dichlorodifluoropropylene, trichlorotrifluoropropylene, tetrafluorodichloropropylene, chloropentafluoropropylene, hexafluoropropylene, dichlorotrifluoropropylene, chlorotetrafluoropropylene, pentafluoropropylene, chlorotrifluoropropylene, trifluoropropylene, chlorodifluoropropylene, and tetrafluoropropylene. Of these, vinyl fluoride, vinylidene fluoride and chlorotrifluoroethane are preferred.

Representative examples of the optional vinyl esters of alkanecarboxylates are the vinyl esters of the fatty acid series from acetic to stearic acids, vinyl butyrate being preferred, and the vinyl esters

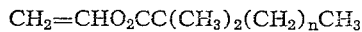

where n is zero to nine, e.g.,

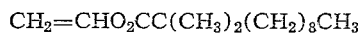

Representative examples of the optional alkyl vinyl ethers are methyl vinyl ether, ethyl vinyl ether, propyl vinyl ether, isopropyl vinyl ether, isobutyl vinyl ether, hexyl vinyl ether, perfluoromethyl perfluorovinyl ether, 1-trifluoromethyl-2,2,2-trifluoroethyl vinyl ether, n-butyl perfluorovinyl ether, 2,2,2-trifluoroethyl perfluorovinyl ether, 1,1,2-trifluoro-2-chloroethyl vinyl ether, 2-ethoxypentafluoropropylene, and ethyl trifluorovinyl ether. Of these, the fluorinated alkyl vinyl ethers are preferred.

When an optional monomer from this class (A) is polymerized with the three essential components of the polymers of this invention, increased solubility is generally detected. Since it is generally convenient to apply protective coatings from solution, a preferred class of polymers of this invention contain the optional component (A) and are soluble in trichloroethylene at room temperature to the extent of at least 3% by weight.

In cases where high durability on metals is particularly desirable, it is useful to copolymerize with the tetrafluoroethylene, hydrocarbon olefin, and vinyl aromatic carboxylate monomers from about 0.005 to 0.2 mole per mole of tetrafluoroethylene of an olefinically unsaturated polymerizable acid having an acidity constant ($pK_a$) of from 1.0 to 5.5. These materials which give high durability on metal are referred to as the optional monomer component (B). More particularly, such additional acid monomers are the mono- and dicarboxylic acids, the phosphonic acids, and the lower alkyl mono- and diesters, the salts and the anhydrides of such carboxylic and phosphonic acids. It is preferred to use from about 0.01 to about 0.10 mole of acid monomer per mole of tetrafluoroethylene when the optional monomer is used. Polymerizable sulfonic acids such as esters of ethylenesulfonic acid do not markedly increase the durability of the present polymers and hence are not useful in the present invention. Useful monomeric materials falling within this group include the carboxylic acids from 3 to 11 carbon atoms such as acrylic acid, methacrylic acid, α-chloroacrylic acid, crotonic acid, vinylacetic acid, allylacetic acid, 10-undecylenic acid, 3-methylenecyclobutanecarboxylic acid, oleic acid, maleic acid, fumaric acid, itaconic acid, and the phosphonic acids having up to 18 carbon atoms such as vinylphosphonic acid, allylphosphonic acid, 17-octadecenephosphonic acid and 2-phosphonylmethylpropane-3-phosphonic acid. Useful lower alkyl esters of the above acids include the various isomeric methyl, ethyl, propyl, butyl, amyl, and hexyl mono- and diesters. The esters of maleic and fumaric acid are particularly preferred as an optional component in the polymers of this invention because they increase the solubility of the polymer in addition to giving the polymer high durability on metals. Useful examples of the maleic and fumaric acid esters are the dimethyl, diethyl, dipropyl, dibutyl, diamyl and dihexyl esters. Dibutyl esters of maleic acid are preferred where high solubility and high durability on metals are desired. For simple high durability on metal, the neopentyl and tert.-butyl esters are the preferred alkyl esters and 2-chloroethyl esters are preferred haloalkyl esters. Because of their hygroscopic nature, the phosphonic acid monomers are preferably used as esters. Polymerizable anhydrides, such as maleic anhydride, itaconic anhydride and the anhydride of the monoethyl ester of vinyl phosphonic acid, may also be used. The sodium and potassium salts of the above acids are also very useful, such as disodium vinyl phosphonate and sodium acrylate. Bis(2-chloroethyl)vinylphosphonate and itaconic acid are the preferred optional component (B) monomers.

Inert materials such as dyes, pigments or antioxidants may be incorporated into the polymers of this invention either by being included in the polymerization mixture or preferably by being mixed with the preformed polymers by means well known in the art such as sand milling or ball milling. When pigmented polymers are desired, usually from 20 to 60 parts of finely divided pigments per 100 parts of polymer are incorporated in the preformed polymers by sand or ball milling. Pigments such as titanium dioxide and copper phthalocyanene work well in the polymer coatings of this invention. As the polymers of this invention are essentially transparent to ultraviolet light, absorbers of ultraviolet light may also be incorporated into the polymers if the substrate being treated is itself sensitive to ultraviolet light, as in the case of most woods.

Experience has shown that it is desirable to modify the polymers of the present invention when a pigmented coating is desired. In order to improve compatibility between the pigment and the polymer, it has been found desirable to add optional monomers, such as those classified as component (A) monomers, which increase the solubility of the polymer and tend to destroy the crystalline character of the polymer. An example of such monomers would be the vinyl alkane carboxylates such as vinyl butyrate and dibutyl maleate. Pigmented polymers formed from tetrafluoroethylene/isobutylene/vinyl benzoate/an acid monomer from component (B) such as itaconic acid, acrylic acid, methacrylic acid and their esters/and vinyl butyrate or dibutyl maleate give the best polymer coating with substrates such as steel, steel primed with organic primers, such as red lead-linseed oil, epoxy or vinyl dioxolane primers; galvanized iron, copper; brass; and most plastics.

The polymers of the present invention may be applied as protective coatings on a number of different types of substrates which include ferrous metals such as iron and steel, ferrous alloys such as stainless steel, non-ferrous metals such as aluminum, zinc, copper and the like and alloys thereof, wood of all types, cellulose products such as paper, and other construction materials such as concrete, plastics, brick, asphalt, etc. The polymer coatings may be applied to metals directly or may be applied over metals which have been surface treated with anticorrosion precoatings such as in the case of an anodized surface on aluminum. One method of application involves dissolving polymers in a common organic solvent such as trichloroethylene, hydrocarbons such as xylene, tetrahydrofuran, or mixed solvents such as trichloroethylene/tetrachloroethylene/ethyl acetate or trichloroethylene/xylene, and then applying the solutions to the surface. Evaporation of the solvent leaves a continuous film which is durable and weather resistant. This method is particularly useful with the more soluble polymers of this invention. The polymers containing ethylene, being less soluble, are more readily applied by melt techniques such as melt extrusion.

After solution application of the polymer, the remaining treatment required for best results depends on the type of polymer used. Many of the polymers containing isobutylene surface coalesce and hence require no further heat treatment. However, if the polymer does not surface coalesce, a heat treatment is needed to insure a complete continuous film coating. The heat treatment consists of passing the coated substrate, if it can withstand the treatment, through an oven or other heating means for one to two minutes at 150 to 250° C. Such heat treatment is particularly useful when surface coatings are applied to metals. The desirability of the heat treatment varies with both the surface being coated and the polymer being used. When metals such as aluminum, zinc, or chromium are being coated or when the polymer contains chain units derived from a derivative of an olefinically unsaturated polymerizable acid (component B), heating is recommended.

The coating thickness on the substrate is variable at will and is adjusted by the control of the concentration of polymer in the solution and the amount of solution applied. Coatings of one mil thickness have been found particularly suitable as protective coatings for most substrates. Ten to 25% by weight solutions of the polymer in trichloroethylene or xylene have been found particularly useful in giving polymer coatings of sufficient thickness for most purposes, but a wide range of other concentrations can be used where different coating thicknesses are desired.

When the less soluble polymers, e.g., those containing ethylene, are applied by melt techniques such as melt extrusion, melt coating or flame spraying techniques, the polymers are softened during or after application. Further heat treatment is not usually required to obtain complete, coalesced coatings.

The polymers of the present invention are medium to high molecular weight materials having molecular weights in excess of 5,000, with upper limits of about 500,000. It has been found, however, that inherent viscosity is a far more useful characteristic of the present polymers than molecular weight since there usefulness as coating materials is directly related to their inherent viscosities without reference to molecular weight. The polymers of this invention have inherent viscosities between 0.1 and 3.0 as 0.5% solutions by weight in trichloroethylene or dimethylacetamide at 30° C. The polymers of this invention having inherent viscosities of 0.2 to 1.0 are preferred. The inherent viscosity is derived from the equation $$n_i = \frac{1}{c}\ln[n/n_o]$$

wherein $n_i$ is the inherent viscosity, $n$ is the measured viscosity of the 0.5% solution in trichloroethylene, $n_o$ is the measured viscosity of pure trichloroethylene, ln is the natural logarithm, and $c$ is the concentration of polymer in grams/100 ml. of solution. The method of measurement used herein was the capillary or Ostwald method. For further details on viscosity measurements, see Weissberger, "Techniques of Organic Chemistry," vol. 1, part 1, third edition, p. 689 et seq.

The preferred class of compositions of the present invention is tetra-polymers of (1) tetrafluoroethylene, (2) either isobutylene or ethylene, (3) vinyl benzoate, and (4) itaconic acid or β(2-chloroethyl)vinylphosphonate. These compositions are particularly suitable as clear coatings on metal such as aluminum. Within this class, the tetra-polymers of tetrafluoroethylene, isobutylene, vinyl benzoate, and itaconic acid or β(2-chloroethyl)vinylphosphonate are most preferred. The preferred compositions for use in toluene or xylene solution are the penta-polymers of tetrafluoroethylene, isobutylene, vinyl benzoate, vinyl butyrate, and itaconic acid.

The polymers of the present invention are prepared by polymerizing mixtures of the various monomers together in the presence of a free radical initiating system, including peroxy compounds, azo compounds, ultraviolet light and ionizing radiation, in either inert organic solvents or in aqueous suspension or emulsion. Many useful solvent or solvent combinations are known. These include the lower molecular weight, straight-chain saturated fatty acids such as acetic acid, tertiary alcohols such as tertiary-butyl alcohol, saturated aliphatic nitriles such as acetonitrile, chlorofluorocarbons and fluorocarbons such as trichlorotrifluoroethane, perfluorodimethylcyclobutane or perfluorodimethylcyclohexane, certain inert esters such as 2,2,3,3-tetrafluoropropyl acetate, and halogenated aromatic hydrocarbons such as ortho-dichlorobenzene. The use of these particular solvents allows the preparation of higher molecular weight polymers of more uniform composition under otherwise equivalent conditions than other solvents. Solvent combinations such as trichlorotrifluoroethane with acetonitrile or acetic acid, tertiarybutyl alcohol with acetic acid or water, acetic acid with monochlorodifluoromethane or tetrafluoropropyl acetate with acetic acid have also been used as effective solvent media in which the polymers of the present invention are prepared. The amount of solvent used should be sufficient to disperse or dissolve the polymeric product as it is formed. Generally, the weight of solvent should be at least equal the weight of the reactants.

As a general rule, organic peroxides which are soluble in the reaction solvent are used as the free radical initiators. At temperatures below 100° C., acyl peroxides such as dilauroyl peroxide or benzoyl peroxide are useful. However, if the optional olefinically unsaturated acid monomer is a free carboxylic acid such as acrylic or methacrylic acid, peroxy esters such as tertiary-butyl perbenzoate, tertiary-butyl peroxypivalate or tertiary-butyl peracetate should be used. In general, the reaction is carried out at the decomposition temperature of the free radical initiator, which is between 50° C. and 160° C. for the polymerization reactions making the polymers of this invention. In reactions which are particularly difficult to initiate, di-tertiary-alkyl peroxides such as di-tertiarybutyl peroxide at 120 to 160° C. are recommended.

Since reaction of the growing molecular chain with the solvent gives low molecular weight brittle polymers, the reaction should be carried out as a general rule at as low a temperature as possible since this minimizes the tendency of the solvent to enter into the reaction. A second mode of minimizing solvent reaction is by the use of higher pressures which increases the concentration of the more volatile monomers such as tetrafluoroethylene in the reaction solvent. Increased amounts of tetrafluoroethylene in the reaction solvent increase the probability of chain propagation over chain transfer with the solvent. Polymerization at higher pressures is further advantageous in that the higher pressures enable the polymerization to be carried out at minimum temperatures.

The copolymerization is carried out in a sealed system adapted to withstand the pressures necessitated by the reaction. The necessary pressures may range from 100 p.s.i.g. to 10,000 p.s.i.g. or higher depending on the particular polymer formed and the free radical initiator used. Either batch or continuous systems may be used. The materials of construction for the reaction system require no special consideration except that they must be capable of withstanding the temperatures and pressures used. Generally, steel, "Monel," "Inconel," "Hastelloy," or stainless steel are used.

In the batch system, the reactants, solvent and initiator are added to the pressure vessel and heated, usually with agitation, until the reaction stops. The order of addition is not critical. However, it is preferred to add the liquid components to the vessel first and thereafter add the gaseous components which must be added under pressure. Once initiated, many of these polymerizations are exothermic, and care should be taken to maintain temperature control. When the reaction is complete, any unreacted gaseous monomers are removed or recovered. The liquid reaction mass is then diluted with ethyl alcohol or other solvent which causes the polymeric product to precipitate completely. The precipitated product is then washed with alcohol and dried. The reaction solvent may be recovered if desired, but the alcohol used to precipitate the polymer should be carefully removed from the reaction solvent before reuse since the precipitating alcohol would interfere with further polymerizations.

In a continuous process, which is preferred, the solid and liquid monomers being used and the initiator are dissolved in the reaction solvent. The resulting solution is pumped into an agitated pressurized reaction vessel which is liquid-full of reaction mixture at the desired reaction temperature. At the same time, gaseous monomers such as isobutylene nad tetrafluoroethylene under pressure are also forced into the same liquid-full pressurized reaction vessel. The reactants are admitted into the vessel in essentially the same ratio as desired in the final product. The pressure within the vessel is maintained at or above autogenous pressure by a pressure release valve in the exit line which opens when its release pressure is reached. Since reactants are continuously pumped into the vessel, product is continuously discharged from the system through the pressure release valve. The fluid end product is usually diluted with alcohol or other solvent to completely precipitate the copolymer which is then further treated as in the batch process.

The continuous process is preferred because it produces a more uniform product than the batch process. This is probably due to the fact that a continuous operation makes it possible to maintain more uniform concentrations of reactants in the solvent at all times. In a batch process, the concentrations of reactants in the reaction media vary as they are consumed. In operating the continuous process, it is especially preferred to use 2,2,3,3-tetrafluoropropyl acetate or ortho-dichlorobenzene as the reaction solvent. Pressures for the continuous process are preferably above autogenous pressure, and more preferably about 800 to 900 p.s.i. The preferred reaction temperature for preparing the majority of polymers of the present invention is from 80 to 100° C. Feed rates are adjusted to produce maximum conversion which usually involves average residence times in the reaction vessel of from 1.5 to 3.0 hours under the preferred conditions cited. It is understood, of course, that the preferred conditions outlined above vary with the particular combination of monomers used.

The polymers of this invention differ from other available fluorine-containing polymers in several ways. The copolymers or dipolymers of equivalent molecular weight of just tetrafluoroethylene and the hydrocarbon olefin are too insoluble and too high melting in general to be useful as coating materials. If sufficient hydrocarbon is incorporated to increase the solubility or lower the melting range to be equivalent to the polymers of this invention, the amount of hydrocarbon olefin is so high that chemical and thermal stability, weatherability and like properties necessary for protective coatings are poor. The copolymers of tetrafluoroethylene and hydrocarbon olefins also do not, by themselves, adhere well enough to substrates to be directly useful.

If another monomer is included in the tetrafluoroethylene, hydrocarbon copolymers to render the polymerrs more soluble or lower melting, the polymers are often soft and easily marred and hence not useful as coating materials. The polymers of this invention, containing the vinyl aromatic carboxylate as the third essential component, are soluble to thhe extent that they may be solvent applied, and yet, in contrast to similar terpolymers which do not contain the vinyl aromatic carboxylate, remain as hard or even increase in hardness over the original tetrafluoroethylene/olefin diploymers.

Inclusion of any of the optional monomers, such as the acidic monomers, in the polymers of this invention containing the vinyl aromatic carboxylates as the third essential components does not decrease the hardness of the polymers. It is thus apparent that the polymers of this invention are unexpectedly superior to other known tetrafluoroethylene polymers as easily applied, durable, mar-resistant, surface coating materials which are self-adherent to a wide variety of substrate materials.

Representative examples illustrating the present invention follow. All parts are by weight unless specified otherwise. Elemental and instrumental analyses were carried out using standard techniques well known in the art. The presence and number of free acid groups, were determined, were analyzed by dissolving a weighted sample of the polymer in a suitable solvent such as trichloroethylene and titrating with standardized alcoholic sodium hydroxide. Outdoor exposures and weathering tests were carried out in the usual manner. The Grid-Bend-Boil Test referred to in the following examples is a rigorous test measuring the degree of coating adhesion to substrates. The test is conducted by first applying the coating to a strip of aluminum or other metal substrate by whatever method particularly suited to the polymer. After the coating operation is complete, a series of perpendicular lines, 8 in each direction, ⅛ inch apart, is scored through the coating to the metal surface beneath. The test strip is then bent or folded through the cross-hatched area in the coating. The aluminum strip is bent or folded approximately 180 degrees. The bent strip is thereafter immersed in boiling water for at least one hour. After removal from the boiling water, the coated test strip is examined for signs of failure in the film, which is evidenced by a change in appearance in the metal underneath the coating. Adhesion of the coating to the substrate is tested by sticking a piece of pressure-sensitive tape over the cross-hatched area. The tape is stuck to the cross-hatched area as it extends from one side of the bent strip across the fold to the other side of the bent strip. The tape is then pulled away. Good adhesion is indicated when none of the coating is removed with the tape. Fair adhesion is indicate when the coating fails only at the bend while poor adhesion is indicated when the polymer coating is removed from the entire cross-hatched area. Complete failure of the coating is evident when the entire coating delaminates from the surface of the test piece.

Melt flow rate in the following examples was determined using ASTM Method D–1238–62T. Flow rate is measured for the purposes of this invention by forcing the melted polymer at a specified temperature through an orifice having a diameter of 0.0825 in. and length of 0.319 in. with a weight of 2160 g. Flow rate can be defined as the weight of molten polymer that passes through the orifice in 10 minutes at the given temperature and at the given extrusion weight.

The "sticking temperature" is a softening temperature which is measured by a determination of the lowest temperature at which a polymer in contact with the heated brass block leaves a molten trail when moved across the block.

Film or coating harness was determined by the Pencil Method as illustrated in the following articles by W. T. Smith, Official Digest 28, 232–7 (1956); H. A. Gardner and G. G. Sward, Paint Testing Manual, 12th ed., Gardner Laboratory, Inc., Bethesda, Md., 1962, p. 131.

EXAMPLE 1

A 400 ml. pressure vessel was flushed with nitrogen and charged with 280 ml. of 2,2,3,3-tetrafluoropropyl acetate, 25 ml. (26 g., 0.18 mole) of vinyl benzoate, 5 ml. (6.0 g., 0.026 mole) bis(2-chloroethyl) vinylphosphonate, and 0.8 g. of dilauroyl peroxide. The pressure vessel was closed, cooled in Dry Ice-acetone and evacuated. Seventy-five g. (0.75 mole) of tetrafluoroethylene and 40 g. (0.72 mole) of isobutylene were added to the vessel. The pressure vessel and its contents were then shaken and heated to 58° C. at autogenous pressure (4500 p.s.i.). Over a period of 10 hours the temperature was gradually increased to 70° C. At the end of the 10-hour heating period the pressure had dropped to 350 p.s.i. The pressure vessel and its contents were cooled to room temperature and, after venting any unreacted gases, the contents were discharged. The reaction mixture was thereafter diluted with an equal volume of ethanol, filtered and the resulting filter cake washed with 2 liters of ethanol. The white, curd-like filter cake was then dried at 100° C. in a vacuum oven to yield 56 g. of a hard, white solid.

Elemental analysis of the solid polymer revealed a phosphorous content of 1.0% and a fluorine content of 32.0%. These analyses corresponded to a polymer having a 7.0% by weight content of bis(2-chloroethyl) vinylphosphonate-derived groups and to 42% by weight content of tetrafluoroethylene-derived groups. The presence of groupings within the polymer derived from the vinyl benzoate was further indicated by absorption lines in the infrared spectra at 5.8 microns. The polymer exhibited a melt flow rate of 17.4 at 195° C. Fibers which were cold drawable at room temperature were drawn from the melt at 250° C. The polymer was completely soluble in trichloroethylene at room temperature to give solutions containing greater than 10% by weight solids. The interpolymer is also soluble at room temperature in tetra hydrofuran, 1,1,2-trichloro-1,2,2-trifluoroethane and 1,1,1,3-tetrachloro-2,2,3,3-tetrafluoropropane.

A solution of 9 g. of the polymer in 75 ml. trichloroethylene was cast onto bright aluminum which had been degreased with acetone. After evaporation of the solvent, a 1 mil coating formed. The coated strip was then baked at 200° C. for one minute. This coating gave good adhesion in the Grid-Bend-Boil Test. The solution of copolymer in trichloroethylene was also cast to form a clear, continuous, completely coalesced crystal-clear film at room temperature.

The copolymer exhibited an inherent viscosity of 0.36 as a 0.5% solution in trichloroethylene at 30° C.

When heated the interpolymer softens and becomes slightly rubbery at about 75° C. and has a "sticking temperature" of 87° C.

The contribution to film hardness by a vinyl aromatic carboxylate-derived component in the polymer chain is illustrated by a comparison of the above tetrafluoroethylene/isobutylene/vinyl benzoate/bis(2-chloroethyl) vinylphosphonate tetra-polymer with a tetra-polymer prepared under essentially the same reaction conditions but with vinyl phenylacetate substituted for the vinyl benzoate. The pencil hardness of a 1 mil coating of the vinyl phenylacetate-containing interpolymer measured only HB as compared to 2H–3H for the vinyl benzoate-containing interpolymer.

EXAMPLE 2

The procedure of Example 1 was repeated using 210 ml. of t-butanol, 100 ml. of acetic acid, 31 g. (0.21 mole) of vinyl benzoate, 1.0 ml. of tert.-butyl peroxypivalate, 0.5 g. (0.004 mole) of itaconic acid, 75 g. (0.75 mole) of tetrafluoroethylene and 30 g. (0.54 mole) of isobutylene. While being shaken continuously, the pressure vessel containing this polymerization mixture was heated to 52° C. at which the autogenous pressure was 3900 p.s.i. Over a nine-hour period the temperature was slowly increased to 65° C., and, at the end of the nine hours, the autogenous pressure had dropped to 475 p.s.i. at 65° C. After cooling, the contents of the pressure vessel were discharged. The reaction mixture, which contains a swollen soft solid, was diluted with an equal volume of ethanol, and the mixture filtered. The solid residue was thoroughly washd with 2 liters of ethanol and then dried at 100° C. in a vacuum oven. The dried solid polymer weighed 78 g.

Elemental analysis of the dry polymer gave the following results:

Fluorine 40.9%—indicated 53.8% of the polymer chain units were derived from tetrafluoroethylene.

Carboxyl 0.19%—indicated 0.27% of the polymer chain units were derived from itaconic acid.

The infrared spectra showed the presence of chain units derived from vinyl benzoate by absorption bands at 5.8, 6.2, 6.3, 6.7, and 14.1 microns.

The polymer readily dissolved in trichloroethylene at room temperature to a greater extent than 3% by weight of the polymer. The polymer was also soluble at room temperature in tetrahydrofuran, 1,1,2-trichloro-1,2,2-trifluoroethane and 1,1,1,3-tetrachloro-2,2,3,3-tetrafluoropropane but was insoluble in methyl ethyl ketone, o-dichlorobenzene, dimethylacetamide and m-cresol while being partially soluble in toluene and xylene.

The polymer melt fused at 250° C. to yield a melt from which a fiber was readily drawn. At room temperature the fibers were cold drawable. From a trichloroethylene solution the polymer was cast into a thin film which after evaporation of the trichloroethylene at room temperature gave a strong hard film which crinkled with a metallic sound. Application of the trichloroethylene solution to bright aluminum gave a clear, continuous coating after room temperature evaporation of the solvent. This coating on bright aluminum exhibited excellent adhesion, even after extended boiling in water. The adhesion of the polymer containing the itaconic acid was even better than a similar coating of a polymer of tetrafluoroethylene, isobutylene and vinyl benzoate free of an acid or acid derivative such as itaconic acid.

The polymer exhibits an inherent viscosity of 0.57 as a 0.5% solution in trichloroethylene at 30° C.

The polymer exhibited a sticking temperature of 100° C.

A solution prepared from 10 g. of the tetrafluoroethylene/isobutylene/vinyl benzoate/itaconic acid tetra-polymer in a mixture of 100 ml. of trichloroethylene, 20 ml. tetrachloroethylene and 40 ml. ethyl acetate was brushed onto a chrome panel. After drying at room temperature for 48 hours, the panel was subjected to accelerated weathering in the "Atlas Weather-Ometer" (Atlas Electric Devices Co., Chicago, Ill.) from which the glass filters had been removed. The panel was continuously subjected in the machine to the unifiltered light of a carbon arc and for 18 minutes out of every two hours was subjected to a spray of distilled water. The air temperature in the machine was set at 140° F. and the surface temperature of a black panel set in exposure position reached 165° F. to 170° F. before the water spray. After 425 hours in the "Atlas Weather-Ometer," the coating still exhibited excellent adhesion at an X-cut.

EXAMPLE 3

The procedure of Example 1 was repeated using 175 ml. of t-butanol, 125 ml. of water, 21 g. (0.14 mole) of vinyl benzoate, 0.8 g. of benzoyl peroxide, 2 g. (0.008 mole) of dineopentyl vinylphospohnate, 75 g. (0.75 mole) of tetrafluoroethylene and 30 g. (0.54 mole) of isobutylene. The reaction mixture was shaken and heated from 71° C. to 100° C. over a period of 7 hours during which time the initial autogenous pressure of 3,250 p.s.i. at 71° C. decreased to 650 p.s.i. at 100° C. After cooling to room temperature the reaction mixture, which contained the solid polymer, was diluted with an equal volume of ethanol. The polymer was then separated by filtration from the mixture, cut up and washed thoroughly with ethanol. After drying at 100° C. in a vacuum oven, a hard, solid polymer weighing 87 g. was obtained.

Elemental analysis of the dry polymer gave the following results:

Phosphorus 0.23%—indicated 1.8% polymer chain units were derived from dineopenty vinylphosphonate.

Fluorine 40.9%—indicated 53.8% polymer chain units were derived from fluoroethylene.

The polymer had a sticking temperature of 130° C.

The dry polymer was melt-coated onto bright aluminum at 250° C. to give a clear continuous coating which exhibited good adhesion when subjected to the Grid-Bend-Boil Test. The polymer was readily soluble in trichloroethylene. At room temperature the polymer was also soluble in tertahydrofuran and in 1,1,1,3-tetrachloro-2,2,3,3-tetrafluoropropane while being insoluble in methyl ethyl ketone, o-dichlorobenzene and m-cresol. It was only partly soluble at room temperature in toluene and xylene.

A 0.5% solution of the polymer in trichloroethylene had an inherent viscosity of 0.84 at 30° C.

EXAMPLE 4

Using the procedure of Example 1 a 400 ml. pressure vessel was charged with 220 ml. of t-butanol, 110 ml. of acetice acid, 26 g. (0.18 mole) of vinyl benzoate, 1.2 g. (0.005 mole) of bis(2-chloropropyl) allylphosphonate, 0.5 ml. of a 75% solution of tert-butyl peroxypivalate in mineral spirits, 60 g. (0.60 mole) of tetrafluoroethylene and 20 g. (0.54 mole) of isobutylene. The vessel and its contents were shaken and heated to 51° C. at which temperature the autogenous pressure was 5000 p.s.i. Over a 10-hour period with continued shaking the temperature was slowly increased to 60° C. At the end of the 10-hour heating priod the autogenous pressure of the mixture was 900 p.s.i. at 60° C. The reaction mixture contained lumps of the granular polymer. The polymer was separated by filtration and washed thoroughly with ethanol. After drying, the polymer weighed 59 g.

Elemental analysis of the dry polymer gave the following results:

Phosphorus 0.04%—indicated 0.35% polymer chain units were derived from bis(2-chloropropyl) allylphosphonate.

Fluorine 40.4%—indicated 53.2% polymer chain units were derived from tetrafluoroethylene.

The polymer exhibited a sticking temperature of 130° C.

A coating of the polymer was applied to acetone-degreased bright aluminum by a melt application at 250° C. The melt-flow properties of the polymer at 250° C. indicated the presence of a small amount of gelled product. The coating, however, was quite bright and clear and gave excellent protection and adhesion to the substrate as evidenced by a good rating achieved upon subjection of the sample to the Grid-Bend-Boil Test. The polymer coating was hard and mar-resistant as evidenced by resistance to marring by the thumbnail. Pencil hardness at a thickness of 1 mil was 2H. From the molten polymer, short fibers were drawn which were capable of slight cold drawing at room temperature. A 0.5% solution of the tetrapolymer in trichloroethylene exhibited an inherent viscosity of 0.47 at 30° C.

The polymer was soluble at room temperature in trichloroethylene, tetrahydrofuran, 1,1,2-trichloro-1,2,2-trifluoroethane and 1,1,1,3-tetrachloro-2,2,3,3-tetrafluoropropane.

A tetrapolymer prepared under similar conditions in which the vinyl benzoate was replaced by vinyl butyrate was soft and possessed weak elastomeric properties. A 1 mil coating of this tetra-polymer of tetrafluoroethylene, isobutylene, vinyl butyrate and bis(2-chloropropyl allylphosphonate exhibited a pencil hardness of only 3B.

EXAMPLE 5

The procedure of Example 1 was repeated using 220 ml. of t-butanol, 100 ml. of acetic acid, 31 g. (0.21 mole) of vinyl benzoate, 0.5 g. (0.006 mole) of methacrylic acid, 0.6 ml. of a 75% solution of tert-butyl peroxypivalate in mineral spirits, 75 g. (0.75 mole) of tetrafluoroethylene and 30 g. (0.54 mole) isobutylene. With shaking the polymerization mixture was heated to 58° C. at which temperature the autogenous pressure was 4100 p.s.i. Over an 8-hour period the temperature was slowly raised to 65° C. At the end of the 8 hours the autogenous pressure had decreased to 400 p.s.i. at 65° C. The dry polymer isolated from the reaction mixture weighed 71 g.

Elemental analysis of the dry polymer gave the following results:

Fluorine 40.3%—indicated 53.0% polymer chain units were derived from tetrafluoroethylene.

Carboxyl 0.35%—indicated 0.68% polymer chain units were derived from methacrylic acid.

The presence of chain units derived from vinyl benzoate was shown by absorption bands in the infrared spectra at 5.8, 6.2, 6.3, 6.7 and 14.1 microns.

A solution of the polymer in a 3:1 (by volume) mixture of trichloroethylene and ethyl acetate was applied to acetone-degreased bright aluminum, and the solvent was allowed to evaporate at room temperature. The resulting coating on the aluminum was clear, bright, and completely coalesced. This coating exhibited good adhesion in the Grid-Bend-Boil Test. Both degreased bright aluminum and aluminum with a conversion coating (Alodine 1200) were melt-coated with the polymer at 250° C. The resulting bright, clear coatings exhibited excellent adhesion with no change in appearance of the coating or the metal beneath the coating when subjected to the Grid-Bend-Boil Test. Fibers over 12 inches in length were readily drawn from the molten polymer. These fibers were cold drawable at room temperature. The inherent viscosity of a 0.5% solution of the polymer in trichloroethylene at 30° C. is 0.42.

The polymer was soluble at room temperature in trichloroethylene, tetrahydrofuran and 1,1,1,3-tetrachloro-2,2,3,3-tetrafluoropropane.

The sticking temperature of the polymer was 132° C.

EXAMPLE 6

The procedure of Example 1 was repeated using 310 ml. of o-dichlorobenzene, 75 g. (0.75 mole) tetrafluoroethylene, 30 g. (0.54 mole) of isobutylene, 31 g. (0.21 mole) of vinyl benzoate, 1.2 g. (0.005 mole) of bis(2-chloroethyl) vinylphosphonate and 1 ml. of "Lupersol 11" (a 75% solution of t-butyl peroxypivalate in mineral spirits). This polymerization mixture was heated to 57° C. The autogenous pressure at that temperature was 900 p.s.i. With continuous shaking the temperature was maintained at 57° C. for two hours and then slowly increased over 6 hours at 65° C. At the end of this heating period the pressure had fallen to 525 p.s.i. at 65° C. After cooling to room temperature the tetrapolymer was isolated as in Example 1. The dried product weighed 81 g.

The polymer dissolved in trichloroethylene at room temperature. Clear, bright films were cast from the trichloroethylene solution at room temperature. Coatings on metal substrates such as aluminum were prepared from the polymer solution and also by direct melt application of the polymer at 250° C. A 1 mil film coating on aluminum had a pencil hardness of 3H. All the coatings on aluminum exhibited excellent adhesion.

A two-component copolymer prepared as above from tetrafluoroethylene and isobutylene did not dissolve in trichloroethylene or any other common organic solvent at room temperature. A coating of this copolymer was melt applied to aluminum at 300° C. At 1 mil thickness, this coating had a pencil hardness of only 2H. The adhesion of the polymer to the metal as measured in the Grid-Bend-Boil Test was very poor. The tetrafluoroethylene/isobutylene copolymer does dissolve in boiling dimethylformamide and in boiling dimethylacetamide, but when these solutions are cooled a few degrees below their boiling points the polymer comes out of solution.

Thus, by comparison, it can be seen that the tetrafluoroethylene/isobutylene/vinyl benzoate polymer is much more useful as a coating composition than the tetrafluoroethylene/isobutylene dipolymer since the polymer containing vinyl benzoate can be dissolved and applied to a substrate at room temperature from solution. Moreover, the vinyl benzoate polymer gives a coating with better adhesion without sacrificing the natural mar resistance of the coating.

EXAMPLE 7

A mixture of 150 ml. of acetic acid, 150 ml. of 1,1,2-trichloro-1,2,2-trifluoroethane, 31 g. (0.21 mole) of vinyl benzoate, 1.2 g. (0.005 mole) of bis(2-chloroethyl) vinyl-phosphonate, 0.6 ml. of a 75% by weight solution of tert.-butyl peroxypivalate in mineral spirits, 10 g.

(0.088 mole) of chlorotrifluoroethylene, 75 g. (0.75 mole) of tetrafluoroethylene, and 30 g. (0.54 mole) of isobutylene were placed in a 400 ml. pressure vessel capable of withstanding 10,000 p.s.i. internal pressure. The pressure vessel and its contents were shaken and heated to 52° C. at which temperature the autogenous pressure measured 1,125 p.s.i. Over a period of 8 hours, the temperature was slowly increased to 65° C. At the end of the 8 hours the autogenous pressure was 200 p.s.i at 65° C. The vessel and its contents were cooled to room temperature and the contents discharged. The resulting reaction mixture was a thick slurry of a polymer which appeared to be almost completely soluble in the reaction medium. This mixture was diluted with an equal volume of ethyl alcohol, filtered and the resulting filter cake washed with approximately 2 liters of alcohol. The solid polymer was dried in a vacuum oven at 100° C. to yield 79 g. of product. Elemental analysis of the dried polymer gave the following results:

Chlorine 2.4%—indicated 7.9% —CFClCF$_2$— units in the polymer chain.

Fluorine 40.3%—indicated 48% of the polymer chain units were derived from tetrafluoroethylene. To arrive at this calculated figure, the fact that the fluorine analysis would also pick up fluorine from the —CFClCF$_2$— units was considered and the appropriate adjustment made.

A 0.5% solution of the polymer in trichloroethylene at 30° C. had an inherent viscosity of 0.32. The polymer exhibited a melt flow rate of 11.9 at 195° C. under a load 2160 g. and an orifice 0.0825 inch in diameter. A coating of the polymer was applied to acetone-degreased bright aluminum by melt application at 250° C. to give a clear, bright coating. Fibers approximately 12 inches in length were readily drawn from the melt and at room temperature these fibers were cold drawable. The polymer was completely soluble at a 10% by weight concentration in trichloroethylene to give a clear solution free of gel. Coatings applied to metal substrates from a trichloroethylene solution of the polymer coalesced at room temperature on evaporation of the solvent to yield completely continuous films. These coatings exhibited good adhesion in the Grid-Bend-Boil Test with no change in appearance of the metal beneath the film.

EXAMPLE 8

By the same procedure as Example 7 a pressure vessel was charged with 200 ml. of t-butanol, 100 ml. of acetic acid, 75 g. (0.75 mole) of tetrafluoroethylene, 30 g. (0.54 mole) of isobutylene, 21 g. (0.14 mole) of vinyl benzoate, 20 g. (0.087 mole) of dibutyl maleate and 0.7 ml. of a 75% by weight solution of tert.-butyl peroxypivalate in mineral spirits. With continuous shaking the reaction mixture was heated to 52° C. at which temperature the autogenous pressure was 600 p.s.i. Over an 8-hour period the temperature was slowly increased to 65° C. At the end of the 8-hour period, the autogenous pressure had decreased to 450 p.s.i. at the 65° C. temperature. The vessel and its contents were cooled to room temperature, and the polymer isolated as before yielding 59 g. after drying in a vacuum oven at 100° C.

Elemental analysis of the dried polymer gave the following results:

Fluorine 33.2%—indicated 43% of the polymer chain units were derived from tetrafluoroethylene.

The presence of chain units derived from vinyl benzoate was shown by absorption bands in the infrared at 5.8, 6.2, 6.7 and 14.1 microns.

A clear, bright coating of the polymer was readily applied to acetone-degreased bright aluminum by melt application of 250° C. This coating exhibited good adhesion with no change in appearance of the bright aluminum underneath the polymer film when the aluminum strip was subjected to the Grid-Bend-Boil Test. From the polymer melt, fibers were readily drawn, and these fibers were cold drawable at room temperatures. The inherent viscosity of a 0.5% solution of the polymer in trichloroethylene at 30° C. was 0.39.

A solution of 0.5 g. of the polymer in 5 ml. of toluene was coated onto aluminum and the solvent allowed to evaporate at room temperature. The resulting coating of polymer was a clear, continuous, completely coalesced film. Preparation of the solution of the polymer in toluene required slight warming, however; the polymer was readily soluble at room temperature in a mixture of equal volumes of toluene and trichloroethylene, and this solution was also useful for the preparation of coatings of the polymer.

The sticking temperature of the polymer was 100° C.

A 1.0 mil melt-applied coating of the polymer on Alodine 1200 aluminum had a pencil hardness of F.

EXAMPLE 9

Using the procedure of Example 7 a pressure vessel was charged with 210 ml. of t-butanol, 100 ml. of acetic acid, 0.5 g. (0.0033 mole) of itaconic acid, 1.0 ml. of a 75% by weight solution of tert.-butyl peroxypivalate in mineral spirits, 21 g. (0.148 mole) of vinyl benzoate, 18 g. (0.15 mole) of vinyl butyrate, 60 g. (0.60 mole) of tetrafluoroethylene, and 30 g. (0.54 mole) of isobutylene. With continuous shaking the reaction mixture was heated to 55° C. at which temperature the autogenous pressure was 650 p.s.i. Over a period of 10 hours the temperature was slowly increased to 65° C. At the end of the 10-hour heating period the autogenous pressure had fallen to 550 p.s.i. at 65° C. After cooling to room temperature the product consisting of a slurry of a swollen polymer was discharged, diluted with ethanol and washed on a filter with approximately 2 liters of ethanol. After drying in a vacuum oven at 100° C., the polymer product weighed 55 g. In trichloroethylene solution containing 0.5% polymer, the inherent viscosity at 30° C. was 0.32.

A coating of this polymer was melt applied to a strip of acetone-degreased, bright aluminum at 250° C. This coating exhibited good adhesion with no change in the appearance of the bright aluminum underneath the clear film when the strip was subjected to the Grid-Bend-Boil Test. From the melt, fibers were drawn, and, at room temperature, these fibers were cold drawable. Solutions of the polymer containing 12% solids were readily prepared in toluene on slight warming. Clear films which coalesced at room temperature were formed from the toluene solution. The films formed from this polymer showed good resistance to tearing.

A 1.0 mil coating of the polymer melt applied to Alodine 1200 aluminum had a pencil hardness of 2H.

The sticking temperature of the polymer was 81° C.

The polymer had good solubility in both xylene and 1,1,1,3-tetrafluoro-2,2,3,3-tetrafluoropropane in addition to trichloroethylene and toluene.

This polymer was particularly compatible with pigments such as titanium dioxide and copper phthalocyanine, and polymer coatings containing such pigments gave hard coatings with excellent gloss.

EXAMPLE 10

In a manner similar to the procedure followed in Example 7, a mixture of 260 ml. of 2,2,3,3-tetrafluoropropyl acetate, 31 g. (0.21 mole) of vinyl benzoate, 15 g. (0.085 mole) of 2-ethoxypentafluoropropene, 1.0 ml. of t-butyl perbenzoate, 75 g. (0.75 mole) of tetrafluoroethylene, and 30 g. (0.54 mole) of isobutylene were placed in a 400 ml. pressure vessel. This reaction mixture was then heated with continuous shaking to 100° C. at which temperature the autogenous pressure was 800 p.s.i. Over a 12-hour period the temperature was increased to 120° C. At the end of this heating period, the autogenous pressure had dropped to 300 p.s.i. From the reaction mixture, there was isolated 103 g. of solid polymer after drying at 100° C.

under vacuum. The inherent viscosity of a 0.5% solution of the polymer in trichloroethylene at 30° C. was 0.26.

The polymer fused to a clear melt on a hot plate heated to 250° C., and, from the melt, long fibers were readily drawn which were cold drawable at room temperature. The polymer was readily soluble in toluene on slight warming, and, from this toluene solution, clear films of the polymer were cast which on evaporation of the solvent at room temperature were completely coalesced. The films were difficult to tear. The polymer was also readily soluble in trichloroethylene at room temperature.

A 1.0 mil melt-applied coating on Alodine 1200 aluminum had a pencil hardness of F.

Pigmented compositions were readily prepared by ball milling 25 g. of rutile titanium dioxide pigment with a solution of 55 g. of the polymer in 300 ml. of xylene. Coatings prepared at room temperature by brush application of this pigmented composition were hard with excellent gloss.

EXAMPLE 11

The procedure of Example 7 was repeated using 200 ml. of t-butanol, 100 ml. of acetic acid, 31 g. of vinyl benzoate, 15 g. (0.168 mole) of 3,3-dimethyl-1-butene, 0.5 g. (0.0043 mole) of itaconic acid, 1 ml. Lupersol 11, 75 g. (0.75 mole) of tetrafluoroethylene, and 25 g. (0.455 mole) of isobutylene. The polymerization mixture was shaken continuously and heated to 53° C. at which temperature the autogenous pressure was 4500 p.s.i. Over a period of 12 hours with continuous shaking the temperature was slowly increased to 75° C. The autogenous pressure at the end of the 12-hour period measured 750 p.s.i. at 75° C. The reaction mixture was then cooled to room temperature and discharged from the pressure vessel. The resulting dispersion of soft swollen polymer was diluted with an equal volume of ethyl alcohol, filtered, and the residue washed thoroughly with approximately 2 liters of alcohol. The polymer was dried at 90° C. in a vacuum oven. After drying, 77 g. of product remained. The inherent viscosity of a 0.5% solution of the polymer in trichloroethylene at 30° C. was 0.20.

Melt application of the polymer to bright aluminum at 250° C. resulted in a clear, bright coating. The Grid-Bend-Boil Test on the coated aluminum indicated the polymer coating had good adhesion. There was no change in the appearance of the bright aluminum beneath the clear film. Fibers were readily drawn from the molten polymer, and these fibers were cold drawable at room temperatures. A clear, gel-free solution of the polymer in toluene was readily obtained at room temperature at a concentration of 0.5 g. of polymer in 5 ml. of toluene.

The sticking temperature of the polymer was 94° C.

Room temperature-dried coatings on aluminum of this polymer applied by spray or by brush techniques from solution showed good adhesion at an X-cut after immersion for five hours in boiling water. The coatings dried at room temperature had a pencil hardness of 2H at a thickness of 0.5 mil.

Pigmented compositions were readily prepared by ball milling 25 g. of rutile titanium dioxide pigment with a solution of 45 g. of the polymer in 300 ml. of xylene. Coatings prepared at room temperature by spray application from this pigmented composition were hard coatings with good gloss. Long-term weathering tests on this pigmented coating on a cement asbestos panel resulted in no change in appearance of the pigment coated asbestos panel.

EXAMPLE 12

The procedure of Example 7 was repeated using 200 ml. of t-butanol, 100 ml. of acetic acid, 36 g. (0.244 mole) of vinyl benzoate, 15 g. (0.063 mole) of vinyl-2,2-dimethylundecaneoate, 1.0 ml. of a 75% solution of tert.-butyl peroxypivalate in mineral spirits, 75 g. (0.75 mole) of tetrafluoroethylene and 30 g. (0.54 mole) of isobutylene. The mixture was heated to 55° C. with continuous shaking. The temperature was then slowly increased to 65° C. for a ten-hour period. The initial autogenous pressure of 4450 p.s.i. at 55° C. dropped to a final pressure of 400 p.s.i. at 65° C. The reaction mixture was diluted with an equal volume of ethanol and the polymer isolated and dried as before. The yield of dry polymer was 113 g.

Elemental analysis of the polymer gave the following results:

Fluorine 40.3%—indicated 53.0% polymer chain units were derived from tetrafluoroethylene.

The infrared spectrum of the polymer in tetrahydrofuran solution showed absorption at 5.8, 6.2, 6.3, 6.7 and 14.1 microns which indicated the presence of chain units derived from vinyl benzoate.

The inherent viscosity of a 0.5% solution of the polymer in trichloroethylene at 30° C. was 0.51. The polymer was readily soluble in toluene upon slight warming. Coatings deposited onto metal or wood substrates from a toluene solution containing 12% polymer air dried to give completely coalesced, clear, continuous coatings at room temperature. The polymer was also coated onto aluminum by melt application at 250° C. These coatings gave good results when subjected to the grid-bend-boil Test.

A 1.0 mil coating melt applied to Alodine 1200 aluminum had a pencil hardness of F.

The sticking temperature of the polymer was 102° C.

Pigmented compositions were readily prepared by ball milling 25 g. of rutile titanium dioxide pigment with a solution of 45 g. of the polymer in 300 ml. of xylene. Coatings prepared at room temperature by spray application from this pigmented composition were hard coatings with good gloss. Long-term weathering tests on this pigmented coating on a cement asbestos panel resulted in no change in appearance of either the pigmented coating or the asbestos panel.

EXAMPLE 13

A mixture of 150 ml. of acetic acid, 150 ml. of 1,1,2-trichloro-1,2,2-trifluoroethane, 31 g. (0.21 mole) of vinyl benzoate and 0.8 ml. of a 75% solution of tert.-butyl peroxypivalate in mineral spirits was placed in a 400 ml. pressure vessel which had been thoroughly flushed with dry nitrogen. The pressure vessel was lined with stainless steel. The vessel was capable of withstanding 10,000 p.s.i. internal pressure. The pressure vessel was then closed, cooled in Dry Ice-acetone and evacuated. Seventy-five g. (0.75 mole) of tetrafluoroethylene and 18 g. (0.64 mole) of ethylene were added to the vessel and the vessel and its contents shaken and heated to 50° C. under autogenous pressure (500 p.s.i.). Over a period of 12 hours, the temperature of the contents was slowly increased to 70° C. The pressure in the vessel was 390 p.s.i. at the end of the 12-hour period. During the heating period the vessel was shaken continuously. The vessel and its contents were cooled to room temperature, and the contents discharged. The reaction mixture was then diluted with an equal volume of ethanol, filtered, and the resulting filter cake washed with 2 liters of ethanol. The thoroughly washed solid polymer was dried at 100° C. in a vacuum oven. Seventy-three grams of a hard, white solid was obtained after drying.

Elemental analysis of the dry polymer gave the following results:

Fluorine 42.1%—indicated the polymer contained 55.4% chain units derived from tetrafluoroethylene.

Absorption bands at 5.8, 6.2, 6.3, 6.7 and 14.1 microns in the infrared spectrum of a thin film of the polymer confirmed the presence of the vinyl benzoate-derived groups at a high concentration level.

The sticking temperature of the polymer was 137° C.

The polymer melted to a clear, colorless melt from which long fibers were easily drawn. These fibers were cold drawable at room temperature. Application of the polymer to a bright aluminum strip on a hot plate heated to about 300° C. gave a clear coating of the polymer on the aluminum. This melt-applied coating on the aluminum strip had a pencil hardness of 2H. This coating was unaffected by such ordinary hot organic solvents as boiling benzene, toluene, xylene, mineral spirits, kerosene and gasoline. A clear solution containing 5% by weight of the terpolymer was prepared by heating a mixture of the dried polymer and dimethylacetamide at 150° C. Coatings of the polymer were readily applied to such metal substrates as galvanized steel from this hot solution, and clear, colorless, moderately tough films were cast from the solution in an oven at 150° C.

Substitution of other fluoroolefins such as chlorotrifluoroethylene for tetrafluoroethylene in the above polymer gave low-melting polymers which have limited utility as coating resins. Thus, a chlorotrifluoroethylene/ethylene/vinyl benzoate terpolymer prepared from 98 g. chlorotrifluoroethylene, 17 g. ethylene and 31 g. vinyl benzoate at 55 to 67° C. with t-butyl peroxypivalate as initiator in a medium of 2,2,3,3-tetrafluoropropyl acetate gave a soft, somewhat rubbery solid even at room temperature. It became quite soft and rubbery at 50° C. and had a sticking temperature of 90° C. Because of this low-softening property, this chlorotrifluoroethylene polymer was not satisfactory as a coating on a substrate which must withstand conditions such as abrasion, physical distortion, high-temperature solvents, or boiling water. Under such conditions the corresponding tetrafluoroethylene-containing polymer coating is far superior.

EXAMPLE 14

Repeating the procedure of Example 13, the pressure vessel was charged with 150 ml. of acetic acid, 150 ml. of 1,1,2-trichloro-1,2,2-trifluoroethane, 15 g. (0.10 mole) of vinyl benzoate, 0.4 g. of dilauroyl peroxide, 75 g. (0.75 mole) of tetrafluoroethylene and 18 g. (0.64 mole) of ethylene. The polymerization mixture was heated with shaking to 61° C. under autogenous pressure (450 p.s.i.). Over a 12-hour period with continued shaking the temperature was increased slowly to 78° C. At the end of the heating period the pressure measured 375 p.s.i. at the temperature of 78° C. After cooling, the polymer was isolated as in Example 13 yielding 48 g. of dry, white solid.

Elemental analysis of the dry polymer gave the following results:

Fluorine 48.7%—indicated the polymer contained 64.1% chain units derived from tetrafluoroethylene.

The presence of polymer chain units derived from vinyl benzoate was confirmed by absorption bands in the infrared spectrum of a film of the polymer at 5.8, 6.2, 6.3, 6.7 and 14.1 microns.

The polymer stick temperature was 205° C. and its crystalline melting point as determined through crossed polarizers was 214° C. The polymer softened slightly at 150° C.

A solution of the terpolymer in hot dimethylacetamide was applied to Alodine 1200 aluminum giving a thin coating of the polymer. A similar clear, colorless coating was also melt applied at 340° C. to a strip of bright aluminum. These coatings were unaffected when immersed in boiling xylene. The melt-applied coating on aluminum had a pencil hardness of H.

From the molten polymer long fibers were readily drawn which were cold drawable at room temperature.

The polymer dissolved completely in boiling dimethylacetamide and in boiling dimethylsulfoxide, but, on cooling a few degrees below the boiling point, the polymer precipitated rapidly. The polymer was insoluble in the following boiling solvents: trichloroethylene, m-cresol, tetramethylene sulfone, dixylyl sulfone, and toluene.

EXAMPLE 15

The procedure of Example 13 was repeated using 150 ml. of acetic acid, 150 ml. of 1,1,2-trichloro-1,2,2-trifluoroethane, 47 g. (0.32 mole) of vinyl benzoate, 1.0 ml. of tert.-butyl peroxy pivalate as a 75% solution in mineral spirits, 75 g. (0.75 mole) of tertafluoroethylene and 18 g. (0.64 mole) of ethylene. The polymerization mixture was heated at 55° C. under an initial autogenous pressure of 2300 p.s.i. and over a 12-hour period the temperature was gradually increased to 78° C. At the end of the 12-hour reaction period the pressure was 400 p.s.i. at 70° C. After cooling to room temperature the polymer was isolated as before and dried. The yield of polymer was 67 g.

Elemental analysis of the dry polymer gave the following results:

Fluorine 39.2%—indicated the polymer contained 51.6% chain units derived from tetrafluoroethylene.

The infrared spectrum of a film of the polymer shows absorption bands at 5.8, 6.2, 6.3, 6.7 and 14.1 microns which were indicative of the presence of groups derived from vinyl benzoate.

The sticking temperature of the polymer was 130° C.

The terpolymer dissolved in dimethylacetamide at 160° C. Melt coating of the polymer onto bright aluminum strips heated to 230° C. on a hot plate gave bright, clear coatings which exhibited good adhesion and were inert to any ordinary solvents at temperatures of 100° C. or less. The melt-applied coatings on aluminum had a pencil hardness of 2H.

Short fibers were drawn from the polymer melt.

EXAMPLE 16

The procedure of Example 13 was repeated using 125 ml. of acetic acid, 150 ml. of 1,1,2-trichloro-1,2,2-trifluoroethane, 1.2 g. (0.005 mole) of bis(2-chloroethyl) vinylphosphonate, 1.1 g. of dilauroyl peroxide, 21 g. (0.14 mole) of vinyl benzoate, 75 g. (0.75 mole) of tetrafluoroethylene and 18 g. (0.64 mole) of ethylene. The polymerization mixture was shaken and heated to 62° C. at which temperature the autogenous pressure was 600 p.s.i. With continued shaking over a period of 8 hours, the temperature was slowly increased to 90° C. At the end of the 8 hours, the autogenous pressure had dropped to 400 p.s.i. at 90° C. The pressure vessel and its contents were cooled to room temperature and the contents discharged. The resulting mixture was diluted with an equal volume of ethanol, filtered and the filter cake washed with 2 liters of ethanol. After drying in a vacuum oven at 100° C., the resulting white, hard, solid polymer weighed 73 grams.

Elemental analysis of dry polymer gave the following results:

Fluorine 45.2%—indicated the polymer contained 59.5% chain units derived from tetrafluoroethylene.

Phosphorus 0.32%—indicated the polymer contained 2.4% chain units derived from bis(2-chloroethyl) vinylphosphonate.

The infrared spectrum of a thin melt-pressed film of the tetra-polymer had bands at 5.8, 6.2, 6.3, 6.7 and 14.1 microns which confirmed the presence of vinyl benzoate-derived groups at a high concentration level in the polymer.

The polymer was readily soluble in hot dimethylacetamide.

The polymer was melt extruded at 220° C. to yield a tough rod. A bright, clear coating, melt applied to bright aluminum at 300° C. exhibited excellent adhesion and resistance to flex. The Grid-Bend-Boil Test on the melt-applied coating on aluminum showed good adhesion with no change in the appearance of the bright aluminum underneath the clear coating. The coating was not affected by boiling xylene. The melt-applied coating on bright aluminum had a pencil hardness of 4H.

EXAMPLE 17

A solution of 200 ml. of t-butanol, 100 ml. of acetic acid, 31 g. (0.21 mole) of vinyl benzoate and 0.4 ml. of a 75% solution of t-butyl peroxy pivalate in mineral spirits was charged into a pressure vessel. Following the procedure of Example 1, 30 g. (0.55 mole) of isobutylene and 75 g. (0.75 mole) of tetrafluoroethylene were then charged to the vessel, and the vessel and its contents heated to 45° C. for 2 hours, and thereafter for 2 hours each at 48, 51, 54, 57, 60, and 65° C. After cooling to room temperature, the reaction mixture was discharged and the polymer isolated. The isolated polymer weighed 68 g. after drying.

A piece of bright aluminum sheeting was coated with the polymer by melt application. The coating had a pencil hardness of 2H at 1.0 mil thickness and exhibited fair to good adhesion. Hard, clear, flexible, completely coalesced films were cast at room temperature from solutions of the polymer in trichloroethylene, 2:1 mixture of trichloroethylene and ethyl acetate, and 1,1,1,3-tetrachloro-2,2,3,3-tetrafluoropropane. The polymer was not completely soluble in xylene or toluene. When heated on a brass block the polymer became clear and somewhat rubbery at 130° C. and possessed a sticking temperature of 190 to 200° C. The polymer melt flowed at 203° C.

In contrast to this room temperature-soluble terpolymer, a copolymer of tetrafluoroethylene and isobutylene, prepared under essentially the same conditions described above, was insoluble in trichloroethylene or any other common organic solvent at room temperature. This tetrafluoroethylene/isobutylene copolymer was soluble in boiling trichloroethylene and in boiling dimethylacetamide; however, when cooled a few degrees below the boiling temperatures, the polymer readily separated from the solutions. Still another copolymer, prepared by polymerizing a mixture of 75 g. of tetrafluoroethylene and 14 g. of isobutylene in a medium of 2,2,3,3-tetrafluoropropyl acetate with dilauroyl peroxide as initiator, was only slightly soluble even in boiling trichloroethylene or dimethylacetamide and had a sticking temperature greater than 250° C.

Substitution of vinyl butyrate for the vinyl benzoate in the above preparation gave a terpolymer of tetrafluoroethylene/isobutylene/vinyl butyrate which was much softer than the tetrafluoroethylene/isobutylene/vinyl benzoate terpolymer. Whereas a coating of the vinyl benzoate-containing terpolymer on aluminum had a pencil hardness of 2H, that of the vinyl butyrate-containing terpolymer is only 4B. The sticking temperature of the vinyl butyrate-containing terpolymer was 66° C.

When the above procedure was repeated, except that methylenecyclohexane or methylenenorbornylene was substituted for isobutylene, good yield of polymers exhibiting the desired balance of properties needed for surface coatings were obtained.

EXAMPLE 18

A solution of 210 ml. of t-butanol, 100 ml. of glacial acetic acid, 31 g. (0.21 mole) of vinyl benzoate, 10.5 g. (0.046 mole) of di-n-butyl maleate, and 1.5 ml. of a 75% solution of t-butyl peroxy pivalate in mineral spirits was charged to a 400 ml. stainless steel-lined pressure vessel. The vessel was swept with nitrogen, cooled to −80° C., evacuated and then charged with 30 g. (0.54 mole) of isobutylene and 75 g. (0.75 mole) of tetrafluoroethylene. With continuous agitation, the vessel and its contents were heated to 45° C. for 2 hours, and then for 2 hours at each of the following temperatures: 48° C., 51° C., 54° C., 57° C., 60° C., and 65° C. After cooling to room temperature, the reaction product was discharged and slurried with 1.5 liters of methanol. The precipitated polymer was filtered from the slurry and reslurried with one liter of methanol. The solid polymer isolated by filtration from the slurry was dried overnight at 90° C. in a vacuum oven to give 111 g. of a dry, colorless polymer.

When heated on clean aluminum at 221° C., the polymer melted and was smeared out to a film coating on the aluminum strip. Long fibers were drawn from the melt. The polymer coating on aluminum was flexible, clear, exhibited good adhesion on the aluminum and had a pencil hardness of F at 1.0 mil thickness. Films of the tetrapolymer were prepared from solutions in xylene, toluene, trichloroethylene, a 2:1 mixture of trichloroethylene and ethyl acetate, and 1,1,1,3-tetrachloro-2,2,3,3-tetrafluoropropane. The polymer's sticking temperature was 167° C.

Elemental analysis gave the following results:

| | Percent |
|---|---|
| Carbon | 52.1 |
| Hydrogen | 2.2 |
| Fluorine | 36.8 |

The infrared spectrum of the polymer exhibited absorption bands at 5.8 microns indicative of ester groups and bands at 6.2, 6.3, 6.8 and 14.1 microns which confirmed the presence of the vinyl benzoate.

EXAMPLE 19

The procedure of Example 1 was repeated using 280 ml. of o-dichlorobenzene, 0.8 ml. of a 75% solution of t-butyl peroxypivalate in mineral spirits, 21 g. (0.14 mole) of vinyl benzoate, 18 g. (0.16 mole) of vinyl butyrate, 75 g. (0.75 mole) of tetrafluoroethylene and 30 g. (0.54 mole) of isobutylene. The reaction vessel was heated to 55° C. at which temperature the autogenous pressure within the vessel was 650 p.s.i. With continuous shaking the temperature was slowly raised over a period of 8 hours to 70° C. At the end of this heating period the pressure had fallen to 475 p.s.i. at 70° C. After cooling to room temperature the tetra-polymer was isolated as in Example 1 to yield 90 g. of dry product.

A coating of this polymer melt applied on a strip of aluminum gave a good rating in the Grid-Bend-Boil Test. The pencil hardness of a 1 mil coating of this polymer was F.

The sticking temperature of the polymer was 113° C.

The polymer was soluble at room temperature in trichloroethylene, xylene and o-dichlorobenzene.

EXAMPLE 20

A 400 ml. pressure vessel was flushed with nitrogen and charged with 210 ml. of t-butanol, 100 ml. of acetic acid, 26 g. (0.175 mole) of cinyl benzoate, 1.0 ml. of Lupersol 11 (a 75% solution of t-butyl peroxypivalate in mineral spirits) and 1.0 g. (0.0178 mole) of acrylic acid. After closing, the vessel was cooled in Dry Ice-acetone and evacuated. Seventy-five grams (0.75 mole) of tetrafluoroethylene and 25 g. (0.595 mole) of propylene were then charged to the vessel. The vessel and its contents were shaken continuously and heated to 50° C. at which temperature the autogenous pressure was 425 p.s.i. Over an eight-hour period the temperature was slowly increased to 65° C. At the end of this eight-hour heating period the pressure was 350 p.s.i. at 65° C. The vessel and its contents were cooled to room temperature and the reaction product discharged. The product was a thick dispersion which settled on standing. The entire product was added to an equal volume of ethanol in a blender. After a second wash with ethanol in the blender the soft polymer was separated from the ethanol by filtration. The polymer was thereafter washed on the filter with 2 additional liters of ethanol. The ethanol-wet polymer was a white, soft, slightly elastomeric solid. On drying at 95° C. in a vacuum oven the polymer gave a clear mass of polymer. A yield of 53 g. of the polymer was obtained.

The dried polymer was shown by analysis to contain 42.9% fluorine which indicated that 56.5% of the polymer chain units were derived from the tetrafluoroethylene. Titration of a solution of the polymer in trichloroethylene with methanolic sodium hydroxide showed 0.94% carboxyl which corresponds to 1.5% combined acrylic acid in the polymer. Infrared spectrum of the polymer in trichloroethylene solution showed absorbance bands at 5.75–5.8, 6.2, 6.3, 6.8 and 14.1 microns which confirmed the presence of the aromatic carboxylate group. The absorbtivity of the 5.8 microns carbonyl band indicated the polymer contained 11% chain units derived from vinyl benzoate. The elemental analytical data indicated an interpolymer composition containing units derived from the monomers in the ratio of 1.0 mole tetrafluoroethylene to 1.3 mole propylene to 0.13 mole vinyl benzoate to 0.04 mole acrylic acid.

When heated, the polymer softened at 85 to 100° C. and melt flowed at 135° C. The lack of birefringence when observed through crossed polarizers indicated that the polymer was noncrystalline. Fibers which were readily pulled from the melt were cold drawable to three times their length at room temperature.

The interpolymer was soluable at room temperature in trichloroethylene, tetrahydrofuran, methyl ethyl ketone, toluene, N,N-dimethylformamide, N,N-dimethylacetamide, xylene, and hexachloroacetone. A film cast from a toluene solution was clear, colorless with good flex. Melt application of the polymer at 150° C. to a strip of bright aluminum (23 mil thickness) gave a coating 1 to 2 mils thick having good adhesion. On flexing the coated aluminum strip, it was noted that the metal broke, but the coating remained intact. The pencil hardness of the polymer coating was HB.

When 1-butene, 1-pentene or 1-octene are substituted for the propylene in the procedure, good yield of polymers exhibiting similar properties suitable for surface coatings were obtained.

EXAMPLE 21

Example 1 was repeated using 300 ml. of o-dichlorobenzene, 1 ml. of a 75% solution of t-butyl peroxypivalate in mineral spirits, 30 g. (0.185 mole) of vinyl p-toluate, 1.2 g. (0.0054 mole) of bis(2-chloroethyl) vinylphosphonate, 75 g. (0.75 mole) of tetrafluoroethylene and 30 g. (0.054 mole) of isobutylene.

The reaction mixture was heated to 55° C. at which temperature the autogenous pressure was 800 p.s.i. With continuous shaking the temperature was slowly increased over a period of 8 hours to 75° C. At the end of this heating period, the pressure had fallen to 550 p.s.i. at 75° C. After cooling to room temperature the tetrapolymer was isolated as in Example 1. The dried product weighed 85 grams.

A clear film of the tetrapolymer was cast at room temperature from a solution prepared at room temperature from 4.5 g. of polymer and 37 ml. of trichloroethylene. The polymer was not soluble in toluene at room temperature. A coating of the polymer was melt applied to bright aluminum at 250° C. The coating, which had a pencil hardness of 3H, gave a good adhesion rating in the Grid-Bend-Boil Test.

EXAMPLE 22

The procedure of Example 1 was repeated using 300 ml. of o-dichlorobenzene, 0.8 ml. of a 75% solution of t-butyl peroxypivalate in mineral spirits, 15 g. (0.076 mole) of vinyl 5-chloro-2-hydroxybenzoate, 75 g. (0.75 mole) of tetrafluoroethylene and 30 g. (0.54 mole) of isobutylene.

The reaction mixture was heated to 65° C. at which temperature the autogenous pressure was 1000 p.s.i. With continuous shaking the temperature was slowly increased over a period of 7 hours to 70° C. At the end of this heating period the pressure had fallen to 700 p.s.i. at 70° C. After cooling to room temperature the tetrapolymer was isolated as in Example 1. The dried product weighed 59 grams.

A coating of the terpolymer was applied to bright aluminum from the melt at 250° C. and the coating gave a good adhesion rating in the Grin-Bend-Boil Test. This coating had a pencil hardness of 2H. The polymer was soluable in tetrahcloroethylene.

Elemental analysis of the dry polymer gave the following results:

Fluorine 44.6%—indicated 58.7% polymer chain units were derived from tetrafluoroethylene.

Chlorine 1.6%—indicated 8.2% polymer chain units were derived from vinyl 5-chloro-2-hydroxybenzoate.

These analyses indicated that the interpolymer contained the combined monomers in the ratio of 1.0 mole tetrafluoroethylene to 1.0 mole isobutylene to 0.08 mole of vinyl 5-chloro-2-hydroxybenzoate.

EXAMPLE 23

Example 1 was repeated using 300 ml. of o-dihclorobenzene, 1 ml. of a 75% solution of t-butyl peroxypivalate in mineral spirits, 21 g. (0.142 mole) of vinyl benzoate, 11 g. (0.067 mole) of vinyl salicylate, 75 g. (0.75 mole) of tetrafluoroethylene, and 30 g. (0.54 mole) of isobutylene.

The reaction mixture was heated to 55° C. at which temperature the autogenous pressure in the vessel was 3000 p.s.i. With continuous shaking the temperature was slowly increased over a period of 8 hours to 66° C. At the end of this heating period the pressure had fallen to 600 p.s.i. at 66° C. After cooling to room temperature the tetra-polymer was then isolated as in Example 1. The dried product weighed 71 grams.

The polymer fused to a clear melt at 230° C. A fiber over 12 inches long was drawn from the melt and was cold drawable at room temperature. A coating of the polymer melt applied at 230° C. to bright aluminum gave a good adhesion rating in the Grid-Bend-Boil Test. The coating had a pencil hardness of 3H.

EXAMPLE 24

The procedure of Example 1 was repeated using 280 ml. of o-dichlorobenzene, 0.6 ml. of a 75% solution of t-butyl peroxypivalate in mineral spirits, 25 g. (0.136 mole) of vinyl o-chlorobenzoate, 18 g. (0.158 mole) of vinyl butyrate, 75 g. (0.75 mole) of tetrafluoroethylene and 30 g. (0.54 mole) of isobutylene.

The reaction mixture was heated to 56° C. at which temperature the autogenous pressure in the vessel was 700 p.s.i. With continuous shaking the temperature was slowly increased over a period of 8 hours to 66° C. At the end of this heating period the pressure had fallen to 490 p.s.i. at 66° C. After cooling to room temperature the tetrapolymer was isolated as in Example 1. The dried product weighed 76 grams.

The tetra-polymer was melt applied to an acetone-degreased strip of bright aluminum at 250° C. This coating gave a fair rating on adhesion in the Grid-Bend-Boil Test. A solution was prepared by dissolving 4.5 g. of the polymer in 37 ml. of toluene at 50° C. Clear films were cast from this solution at room temperature.

EXAMPLE 25

The procedure of Example 1 was repeated using 220 ml. of t-butanol, 100 ml. of acetic acid, 1 ml. of a 75% solution of t-butyl peroxypivalate in mineral spirits, 30 g. (0.147 mole) of vinyl 4-(t-butyl)benzoate, 0.5 g. (0.0043 mole) of itaconic acid, 75 g. (0.75 mole) of tetrafluoroethylene, and 30 g. (0.54 mole) of isobutylene.

The reaction mixture was heated to 55° C. at which temperature the autogenous pressure in the vessel measured 3600 p.s.i. With continuous shaking the temperature was slowly increased over a period of 10 hours to 69° C. At the end of this heating period the pressure had fallen to 350 p.s.i. at 69° C. After cooling to room temperature the tetra-polymer was isolated as in Example 1. The dried product weighed 91 grams.

A solution of the polymer in trichloroethylene gave a clear, colorless coating when cast onto an acetone-degreased strip of bright aluminum. A good glossy coating of 3H pencil hardness was also obtained on aluminum by melt application at 250° C. Good adhesion of the polymer coating was noted when the aluminum strip was subjected to the Grid-Bend-Boil Test.

EXAMPLE 26

The procedure of Example 1 was repeated using 300 ml. of o-dichlorobenzene, 1 ml. of a 75% solution of t-butyl peroxypivalate in mineral spirits, 1.2 g. (0.0054 mole) of bis(2-chloroethyl) vinylphosphonate, 75 g. (0.75 mole) of tetrafluoroethylene, 30 g. (0.54 mole) of isobutylene and 30 g. (0.152 mole) of vinyl α-naphthoate. The reaction mixture was then heated to 61° C. at which temperature the autogenous pressure in the vessel was 1800 p.s.i. With continuous shaking the temperature was slowly increased over a period of 6 hours to 70° C. At the end of this heating period the pressure had fallen to 1000 p.s.i. at 70° C. After cooling to room temperature the tetra-polymer was isolated as in Example 1. The dried product weighed 27 grams.

The polymer dissolved in warm trichloroethylene to give a slightly opalescent solution. A coating of the polymer on aluminum had a pencil hardness of 3H. The polymer exhibited good adhesion on the aluminum substrate.

EXAMPLE 27

The procedure of Example 1 was repeated using 300 ml. of o-dichlorobenzene, 0.8 ml. of a 75% solution of t-butyl peroxypivalate in mineral spirits, 30 g. (0.164 mole) of vinyl o-chlorobenzoate, 75 g. (0.75 mole) of tetrafluoroethylene and 30 g. (0.54 mole) of isobutylene. The reaction mixture was heated to 55° C. at which temperature the autogenous pressure in the vessel was 850 p.s.i. Thereafter, with continuous shaking the temperature was slowly raised over a period of seven hours to 70° C. At the end of this heating period the pressure had fallen to 625 p.s.i. at 70° C. After cooling to room temperature the terpolymer was isolated as in Example 1. The isolated polymer weighed 75 grams.

Elemental analysis indicated 47.3% fluorine and 3.25% chlorine. This elemental analysis further indicated that the polymer contained 0.61 mole of isobutylene and 0.15 mole of vinyl o-chlorobenzoate units for every 1.0 mole of tetrafluoroethylene units.

The presence of the vinyl carboxylate in the polymer was also confirmed by infrared spectrum analysis.

The terpolymer was soluble in trichloroethylene at room temperature and films were cast from the solution. A melt-applied coating on aluminum was clear and tough and possessed good adhesion to the aluminum substrate. Long fibers were readily pulled from the molten polymer.

EXAMPLE 28

A lacquer was prepared by dissolving 10 g. of the tetrafluoroethylene/isobutylene/vinyl benzoate/itaconic acid tetra-polymer of Example 2 in either a solvent mixture of 100 ml. of trichloroethylene, 20 ml. tetrachloroethylene and 40 ml. of ethyl acetate or a solvent mixture of 70 ml. trichloroethylene, 50 ml. methyl ethyl ketone and 30 ml. xylene. The mixed solvents are preferable to trichloroethylene itself because of the lower volatilization rates of the mixed solvents. Strips of bright aluminum, copper, brass, and chrome were sprayed or brushed with this lacquer to yield clear, hard coatings which, after drying at room temperature for 48 hours, exhibited excellent adhesion. Adhesion was tested by making an X-cut through the coating, firmly pressing by hand a piece of pressure-sensitive tape over the cut and pulling away the tape. Excellent adhesion was indicated when none of the coating was pulled away from the substrate. The coatings had excellent clarity and resistance to mar with the pencil hardness of a 0.3 mil coating being greater than 3H.

Approximately one-half of an aluminum panel was coated with a 0.2 to 0.4 mil coating of the tetrafluoroethylene/isobutylene/vinyl benzoate/itaconic acid tetra-polymer. The aluminum panel was then dried at room temperature for several days and subjected to a copper-accelerated, acetic acid, salt spray mist at 120° F. (the Cass Test as described in ASTM-B-368-61T). After 64 hours the uncoated aluminum was almost entirely corroded away while the coated portion was unchanged in appearance. The excellent corrosion resistance of the polymer coating was also shown by the excellent rating achieved by the coating on aluminum when subjected to the Corrodkote Test (see ASTM-B-380-61T), in which the polymer-coated aluminum panel covered with a paste of kaolin, ferric chloride, ammonium chloride, copper nitrate and water was subjected to 100% relative humidity at 100° C. for 16 hours.

EXAMPLE 29

A series of comparative tests were conducted on various polymers within the definition of this invention and commercial, clear-finish spray coatings. These compositions were spray coated onto panels of aluminum, copper and brass to give clear, room temperature-dried coatings. After aging at least 48 hours, an X-cut was made through each coating. In the first test to show adhesion stability to water at the interface, the panels were immersed in boiling water for 136 hours and adhesion measured after boiling at the X-cut with pressure-sensitive tape. The adhesion results are tabulated below in Table I.

TABLE I

| Coating | | | Adhesion to Substrate | | |
|---|---|---|---|---|---|
| Composition | Thickness, mil | Pencil Hardness | Aluminum | Copper | Brass |
| Commercial Coating, a nitrocellulose modified acrylic | 1.0 | 2H-3H | Complete Failure.[1] | Complete Failure.[1] | Complete Failure.[1] |
| (A) Tetrafluoroethylene/isobutylene/vinylbenzoate/itaconic acid tetrapolymer prepared according to Ex. /2. | 0.3 | >3H | Excellent[2] | Excellent | Excellent. |
| (B) Tetrafluoroethylene/isobutylene/vinylbenzoate/vinylbutyrate/itaconic acid penta-polymer prepared according to Ex. 9. | 0.1-0.2 | 3H | do.[2] | do | Do. |
| (C) Penta-polymer prepared by following the procedure of Ex. 17 from 75 g. tetrafluoroethylene/30 g. isobutylene/20 g. vinylbenzoate, 10 g. dibutyl maleate/0.2 g. itaconic acid. | 0-1-0.2 | 2H-3H | do.[2] | do | Do. |

[1] Coating sloughed off of substrate.
[2] Coating still showed excellent adhesion after 500 hours in the boiling water.

The second test was a weathering test to determine the comparable durability of the polymer coatings of this invention. The test showed the stability of the adhesion to thermal and photo degradation. Coatings (0.1–0.3 mil thick) of each of the above interpolymers described in (A), (B) and (C) in Table I above, the commercial nitrocellulose-modified acrylic coating (1.0 mil thick), and a commercial arcylic solution polymer coating (0.5 mil thick, 3H hardness) were spray applied to panels of aluminum, copper and brass. After setting for at least 48 hours, these panels were placed in an accelerated weathering machine. The weathering machine used was an "Atlas Weather-Ometer" (Atlas Electric Devices Co., Chicago, Ill.) from which the glass filters had been removed. The metal-coated panels were continuously subjected to the unfiltered light of the carbon arc for 18 minutes out of every two hours were also subjected to a spray of distilled water. The air temperature in the machine was 140° F. and the surface temperature of a black panel set in exposure position reached a high of 165 to 170° F. each time before being cooled by the water spray.

After 1000 hours exposure in the weathering machine all of the above tetrafluoroethylene interpolymer coatings were unchanged and exhibited excellent adhesion at an X-cut, whereas the two commercial coatings were each completely degraded and none remained on the metal.

EXAMPLE 30

Twenty-five g. of the tetrafluoroethylene/isobutylene/ vinyl benzoate/vinyl butyrate tetrapolymer of Example 19 as dissolved in 80 ml. of xylene with gentle warming. To this solution 12.5 g. of a pigment grade titanium dioxide, 0.5 g. of a pigment grade lampblack, and 2.0 g. of Du Pont "Monastral" Green B pigment were added. The mixture was then placed in a small ball mill and rolled for 7 days with 100 ½-inch ceramic mill balls. The paint was separated from the balls through a coarse wire filter. The paint was stable, since the pigment dispersed well in the polymer and was thoroughly wet by the polymer. This formulation gave a pigment/resin ratio of 60/100. Othere pigment/resin ratios were prepared by suitable adjustment of the amounts of resin and solvent. The paint was applied by brush to a 3" x 6" steel plate. After drying the steel plate at room temperature, a second coat of the paint was applied and allowed to dry at room temperature. A completely coalesced, uniform, streak-free coating having good gloss indicative of good pigment wetting was obtained. Adhesion of the coating to the steel (determined by removing a pressure-sensitive tape at an X-cut through the coating) was good.

Steel panels coated with the paints prepared in this manner from the tetrafluoroethylene/isobutylene/vinyl benzoate/vinyl butyrate and titanium dioxide were exposed in an accelerated weathering machine (see Example 29 for a description of the weathering machine). Slight chalking on any of these coatings occurred only after an exposure time of greater than 240 hours. In comparison, commercial coatings including (a) a long oil alkyd resin metal protective paint, (b) an acrylic solution paint, (c) an epoxy paint, (d) a vinyl resin paint, and (e) a polyurethane paint chalked at less than 150 hours exposure. Thus, it can be seen that paint coatings formulated from the polymers of this invention are almost twice as durable in the accelerated weathering test as are the paints commercially available.

A series of paints were prepared by the above procedure and were applied to both bare steel and primed steel panels by brush. All of the paint coatings had essentially the same good gloss, adhesion and other properties listed above. The polymers and solvents employed in preparing the paints are listed below in Table II.

TABLE II

| Polymer composition: | Solvent used |
|---|---|
| Example 8 | 1,1,1,3-tetrachloro-2,2,3,3-tetrafluoropropane. |
| Example 9 | Xylene. |
| Example 10 | Xylene. |
| Example 11 | Xylene. |
| Example 12 | Xylene. |
| Example 17 | 1,1,1,3-tetrachloro-2,2,3,3-tetrafluoropropane. |

It is to be understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A linear addition-type copolymer comprising in copolymerized form (1) tetrafluoroethylene; (2) from about 0.50 to about 1.50 mole per mole of tetrafluoroethylene of at least one $C_2$ to $C_8$ aliphatic hydrocarbon having only one terminal ethylenically unsaturated group; and (3) from about 0.05 to about 0.50 mole per mole of tetrafluoroethylene of at least one polymerizable vinyl ester of an aromatic carboxylic acid, wherein the aromatic nucleus is derived from benzene and naphthalene.

2. A linear addition-type copolymer comprising in copolymerized form (1) tetrafluoroethylene; (2) from about 0.50 to about 1.50 mole per mole of tetrafluoroethylene of at least one $C_2$ to $C_8$ aliphatic hydrocarbon having only one terminal ethylenically unsaturated group; (3) from about 0.005 to about 0.2 mole per mole of tetrafluoroethylene of at least one polymerizable vinyl ester of an aromatic carboxylic acid, wherein said aromatic nucleus is derived from benzene and naphthalene; and (4) from about 0.005 to about 0.2 mole per mole of tetrafluoroethylene of at least one olefinically unsaturated polymerizable compound chosen from acids having an acidity constant within the range of from about 1.0 to about 5.5 and the ester, salt, and anhydride derivatives of such acids.

3. A linear addition-type copolymer comprising in copolymerized form (1) tetrafluoroethylene; (2) from about 0.50 to about 1.50 mole per mole of tetrafluoroethylene of at least one $C_2$ to $C_8$ aliphatic hydrocarbon having only one terminal ethylenically unsaturated group; (3) from about 0.05 to 0.50 mole per mole of tetrafluoroethylene of at least one polymerizable vinyl ester of an aromatic carboxylic acid, wherein said aromatic nucleus is derived from benzene and naphthalene; and (4) from aobut 0.05 to 0.30 mole per mole of tetrafluoroethylene of at least one olefinically unsaturated polymerizable compound selected from the group consisting of chloroolefins of 2 to 3 carbon atoms, fluoroolefins of 2 to 3 carbon atoms, chlorofluoroolefins of 2 to 3 carbons, vinyl esters of saturated alkane carboxylic acids of 2 to 18 carbon atoms, and alkyl vinyl ethers wherein the alkyl group contains from 1 to 6 carbon atoms.

4. A linear addition-type copolymer comprising in copolymerized form (1) tetrafluoroethylene; (2) from about 0.50 to about 1.50 mole per mole of tetrafluoroethylene of at least one $C_2$ to $C_8$ aliphatic hydrocarbon having only one terminal ethylenically unsaturated group; (3) from about 0.05 to about 0.50 mole per mole of tetrafluoroethylene of at least one polymerizable vinyl ester of an aromatic carboxylic acid, wherein the aromatic nucleus is derived from benzene and naphthalene; (4) from about 0.005 to about 0.2 mole per mole of tetrafluoroethylene of at least one olefinically unsaturated polymerizable compound chosen from acids having an acidity constant within the range of from about 1.0 to about 5.5 and the lower alkyl ester, the salt, and the anhydride derivatives of such acids; and (5) from about 0.05 to 0.30 mole per mole of tetrafluoroethylene of at least one olefinically unsaturated polymerizable compound selected from the group consisting of chloroolefins of 2 to 3 carbon atoms, fluoroolefins of 2 to 3 carbon atoms, chlorofluoroolefins of 2 to 3 carbon atoms, vinyl esters of unsaturated alkane carboxylic acids of 2 to 18 carbon atoms, and alkyl vinyl ethers, wherein the alkyl group contains from 1 to 6 carbon atoms.

5. The copolymer of claim 1 having a solubility at room temperature of at least 3% by weight in trichloroethylene.

6. The copolymer of claim 1 having a solubility at room temperature of at least 3% by weight in dimethylacetamide.

7. The copolymer of claim 4 wherein said olefinically unsaturated polymerizable acid is selected from (A) mono- and dicarboxylic acids having from three to eleven carbon atoms,
(B) the lower alkyl mono- and diesters, the salts, and the anhydrides of said carboxylic acids,
(C) the phosphonic acids having from three to eighteen carbon atoms,
(D) the lower alkyl mono- and diesters, the salts, and the anhydrides of said phosphonic acids.

8. The copolymer of claim 2 wherein said olefinically unsaturated polymerizable comopund of class (4) is bis (2-chloroethyl) vinylphosphonate.

9. The copolymer of claim 2 wherein said olefinically unsaturated polymerizable compound of class (4) is itaconic acid.

10. The copolymer of claim 2 wherein said olefinically unsaturated polymerizable compounds of class (4) is dineopentyl vinylphosphonate.

11. The copolymer of claim 2 wherein said olefinically unsaturated polymerizable compounds of class (4) is dimethyl allylphosphonate.

12. The copolymer of claim 2 wherein said olefinically unsaturated polymerizable compound of class (4) is dibutyl maleate.

13. The copolymer of claim 2 wherein said olefinically unsaturated polymerizable compound of class (4) is present in an amount of 0.01 to 0.1 mole per mole of tetrafluoroethylene.

14. The copolymer of claim 3 wherein the olefinically unsaturated polymerizable compound of class (4) is present in amounts of from 0.1 to 0.2 mole per mole of tetrafluoroethylene.

15. The copolymer of claim 3 wherein the olefinically unsaturated polymerizable compound of class (4) is vinyl butyrate.

16. A linear addition-type copolymer comprising in copolymerized form (1) tetrafluoroethylene; (2) from 0.50 to 1.50 mole of isobutylene; (3) from 0.05 to 0.50 mole of vinyl benzoate; (4) from 0.005 to 0.2 mole of itaconic acid; and (5) from 0.05 to 0.3 mole of vinyl butyrate.

17. An article of manufacture comprising a solid structural surface having adhered thereto a flexible film coating of the copolymer defined in claim 1.

18. An article of manufacture comprising a solid structural metal surface having adhered thereto a flexible film coating of the copolymer defined in claim 1.

19. An article of manufacture comprising a solid structural surface of aluminum having adhered thereto a flexible film coating of the copolymer defined in claim 2.

20. An article of manufacture comprising a solid structural surface of copper having adhered thereto a flexible film coating of the copolymer defined in claim 2.

21. An article of manufacture comprising a solid structural surface of brass having adhered thereto a flexible film coating of the copolymer defined in claim 2.

22. An article of manufacture comprising a solid structural surface of chrome having adhered thereto a flexible film coating of the copolymer defined in claim 2.

References Cited
UNITED STATES PATENTS

| | | |
|---|---|---|
| 2,468,664 | 4/1949 | Hanford et al. |
| 2,479,367 | 8/1949 | Joyce et al. |
| 2,599,640 | 6/1952 | Joyce. |

JOSEPH L. SCHOFER, *Primary Examiner.*

J. KIGHT, *Assistant Examiner.*

UNITED STATES PATENT OFFICE

CERTIFICATE OF CORRECTION

Patent No. 3,380,971

April 30, 1968

John R. Chalmers et al.

It is certified that error appears in the above identified patent and that said Letters Patent are hereby corrected as shown below:

Column 28, line 19, "0.005 to about 0.2" should read -- 0.05 to about 0.50 --.

Signed and sealed this 28th day of October 1969.

(SEAL)
Attest:

Edward M. Fletcher, Jr.
Attesting Officer

WILLIAM E. SCHUYLER, JR.
Commissioner of Patents